March 22, 1966 J. W. WAGNER 3,241,830
SHEET FEED MECHANISM
Filed Dec. 23, 1963 8 Sheets-Sheet 1

FIG. 1

INVENTOR.
JOHN W. WAGNER
BY
ATTORNEY

FIG. 2

INVENTOR.
JOHN W. WAGNER

ATTORNEY

FIG. 3

March 22, 1966   J. W. WAGNER   3,241,830
SHEET FEED MECHANISM
Filed Dec. 23, 1963   8 Sheets-Sheet 4

FIG. 4

INVENTOR.
JOHN W. WAGNER
BY
ATTORNEY

FIG. 5

INVENTOR.
JOHN W. WAGNER
BY
ATTORNEY

FIG. 7

INVENTOR.
JOHN W. WAGNER
BY
ATTORNEY

March 22, 1966 J. W. WAGNER 3,241,830
SHEET FEED MECHANISM
Filed Dec. 23, 1963 8 Sheets-Sheet 8

FIG. 8

INVENTOR.
JOHN W. WAGNER
BY
ATTORNEY

3,241,830
SHEET FEED MECHANISM
John W. Wagner, Penfield, N.Y., assignor to Xerox Corporation, Rochester, N.Y., a corporation of New York
Filed Dec. 23, 1963, Ser. No. 332,464
2 Claims. (Cl. 271—10)

This invention relates in general to xerographic apparatus and, in particular, to a sheet feed device for feeding sheets of support material to a xerographic drum.

More specifically, the invention relates to an improved sheet feed mechanism that is particularly adapted for use in xerographic reproducing machines, and is also suitable for use with comparable types of devices.

It is, therefore, the principal object of this invention to improve sheet feed mechanisms for use in a xerographic apparatus to remove sheets one at a time from the top of a stack of sheets and deliver them to and in timed relation with other mechanisms to a rotating xerographic drum.

Another object of this invention is to improve sheet feeding mechanisms for separating and removing sheets one at a time from a top of a stack of sheets at a relatively high rate of speed.

For a better understanding of the invention as well as other objects and further features thereof, reference is had to the following detailed description of the invention to be read in connection with the accompanying drawings, wherein.

Figure 1:
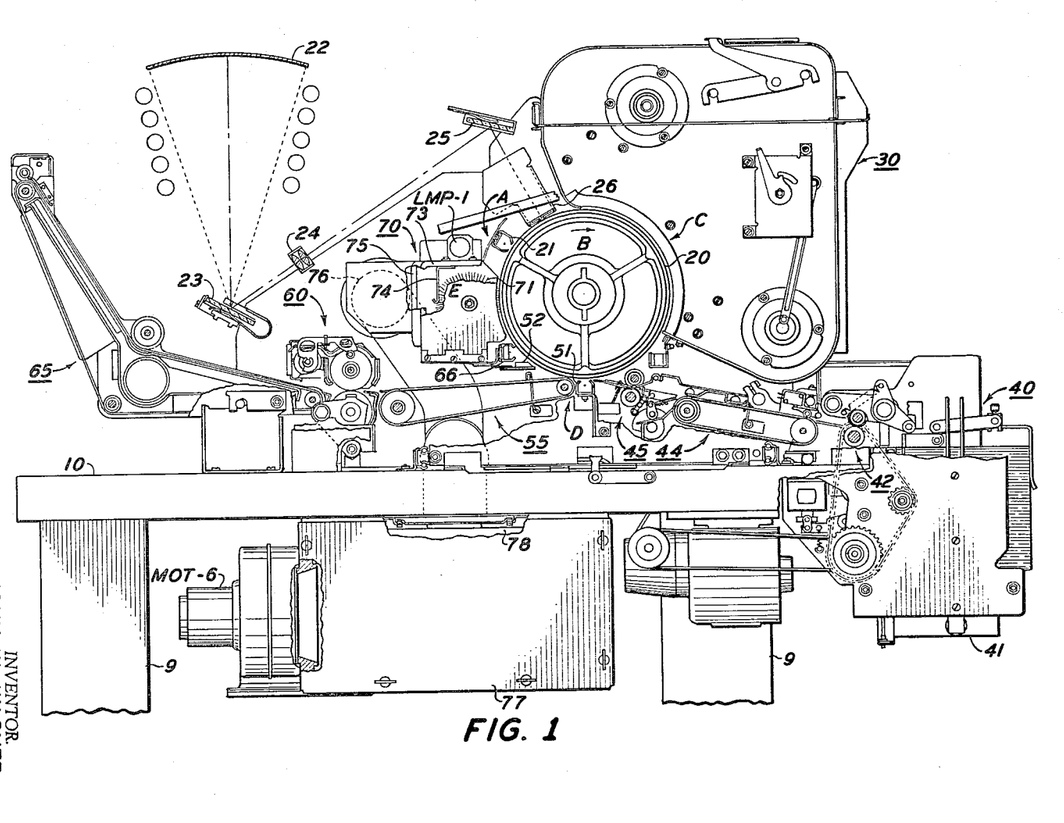
FIG. 1 illustrates schematically a preferred embodiment of a xerographic apparatus having sheet feed mechanism constructed in accordance with the invention.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced.

A transfer station, at which the xerographic powder image is electrostatically transferred from the drum surface to a transfer material or a support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. As shown, the charging arrangement includes a corona charging device 21 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved plate member 22 such as, for example, a glass plate or the like positioned on the exterior of the cabinet, which is adapted to support a document to be reproduced, the document being uniformly illuminated and arranged in light projecting relation to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Adjacent to the exposure station is a developing station C in which there is positioned a developer apparatus 30 including a casing or housing having a lower or sump portion for accumulating developer material. A bucket type conveyor is used to carry the developing material to the upper part of the developer housing where it is cascaded over a hopper chute onto the xerographic drum to effect development. A toner dispenser is used to accurately meter toner to the developing material as toner particles are consumed during the developing operation.

Positioned next and adjacent to the developing station is the image transfer station D which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 40 constructed in accordance with the invention adapted by means of vacuum feeders to feed the top sheet, of a stack of sheets on a tray 41, to a set of feed rollers 42 for advancement by the feed rollers of the sheet to a paper transport 44, which, in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 51 that is located at/or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus or paper pick-off mechanism 52 for removing the sheets of support material from the drum surface. This device, which is of the type disclosed in Rutkus et al. Patent 3,062,536, includes a plurality of small diameter orifices supplied with pressurized aeriform fluid by a suitable pulsator or other device. The pulsator is adapted to force jets of pressurized aeriform fluid through the outlet orifices into contact with the surface of the xerographic drum slightly in advance of the sheet of support material to strip the leading edge of the sheet from the drum surface and to direct it onto an endless conveyor 55 whereby the sheet material is carried to a fixing device 60. At the fixing device, the developed and transferred xerographic powder image on the sheet of support material is permanently fixed or fused thereto as by heat. After fusing, the finished copy is discharged from the apparatus at a suitable point for collection externally of the apparatus by means of the conveyor 65.

The next and final station in the device is a drum cleaning station E, having positioned therein a corona preclean device 66, similar to corona charging device 21, a drum cleaning device 70 adapted to remove any powder remaining on the xerographic drum after transfer by means of a rotating brush 71, and a discharge lamp LMP-1 adapted to flood the xerographic drum with light to cause dissipation of any residual electrical charge remaining on the xerographic drum.

To remove residual powder from the xerographic drum, there is disposed a cylindrical brush 71 rotatably mounted on an axle and driven by a motor, not shown. For collecting powder particles removed from the xerographic drum by the brush, there is provided a dust hood 73 that is formed to encompass approximately two-thirds of the brush area. To ensure thorough cleaning of the brush, a flicking bar 74 is secured to the interior of the dust hood adjacent the edge of the outlet duct 75 of the dust hood and in interfering relation with the ends of the brush bristles whereby dust particles may be dislodged therefrom.

For removing dust particles from the brush and dust hood, an exhaust duct 76 is arranged to cover the outlet of the dust hood, the exhaust duct being connected at its other end to the wall of a filter box 77 attached to the dust hood. A filter bag 78 is secured within the filter box, with the mouth of the filter bag in communication with the exhaust duct. A motor fan unit MOT-6, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor unit.

Suitable drive means are provided to drive the drum, rotating mirror and sheet feed mechanism at predetermined speeds relative to each other, and to effect operation of the bucket-type conveyor and toner dispenser mechanism.

It is believed that the foregoing description is sufficient for the purposes of this application to show the general operation of the xerographic reproducing apparatus. For further details concerning the specific construction, reference is made to copending Gilbert A. Aser and Gordon P. Taillie application, Serial No. 332,653, filed concurrently herewith and to portions of this specification wherein specific elements cooperating with the sheet feed mechanism are illustrated and described although they form no part of the instant invention.

Sheet feed mechanism

Referring now to the subject matter of the invention, the sheet feeding mechanism used to separate the top sheets one at a time from the top of a stack or pile of sheets and to feed the sheets to paper transport 44, may be formed as an integral unit of the reproducing apparatus, or, as shown, may be formed as a separate unit connected to the frame of the reproducing apparatus.

Referring now to the drawings, there is shown a frame including plates 301 and 302 connected together and maintained rigidly in spaced parallel relation to each other by tie rods 307.

The stack or pile of sheets to be separated and advanced are supported on a pack advancing mechanism which includes a table, generally designated 41, formed with a base 311 terminating in depending sides 312 to which are secured a pair of extension arms 313 which carry rollers 314 adapted to ride in guide channels 305 fixed to plates 301 and 302, whereby the table is positioned for movement vertically between these frame plates.

The table is supported by a pair of cables 315. Each cable is secured at one end to an angle plate 316 secured as by welding to a depending side of the table, and at its other end to a pulley 317. The pulleys 317 are fixed to shaft 318 on opposite sides of the table and inboard of plates 301 and 302. Shaft 318 journaled in suitable bearings mounted in the plates 301 and 302 is driven to raise or lower the table by means of gear 321. Stop arm 322 fixed to shaft 318 extends out radially from the shaft to engage a tie bar 307 whereby rotation of the pulleys is limited to less than two revolutions. Gear 321 fixed to the outboard end of shaft 318 engages worm gear 323 fixed to shaft 324 journaled by suitable bearings mounted in the side brackets 303 and 304 of plate 302. A hand wheel 325 is fixed to one end, or rear end of shaft 324 and at the other end, the shaft is provided with a ratchet 326 fixed thereon, the ratchet 326 forming part of a power indexing mechanism to periodically raise the table as a function of the location of the top of the paper stack on the table.

Figure 8:
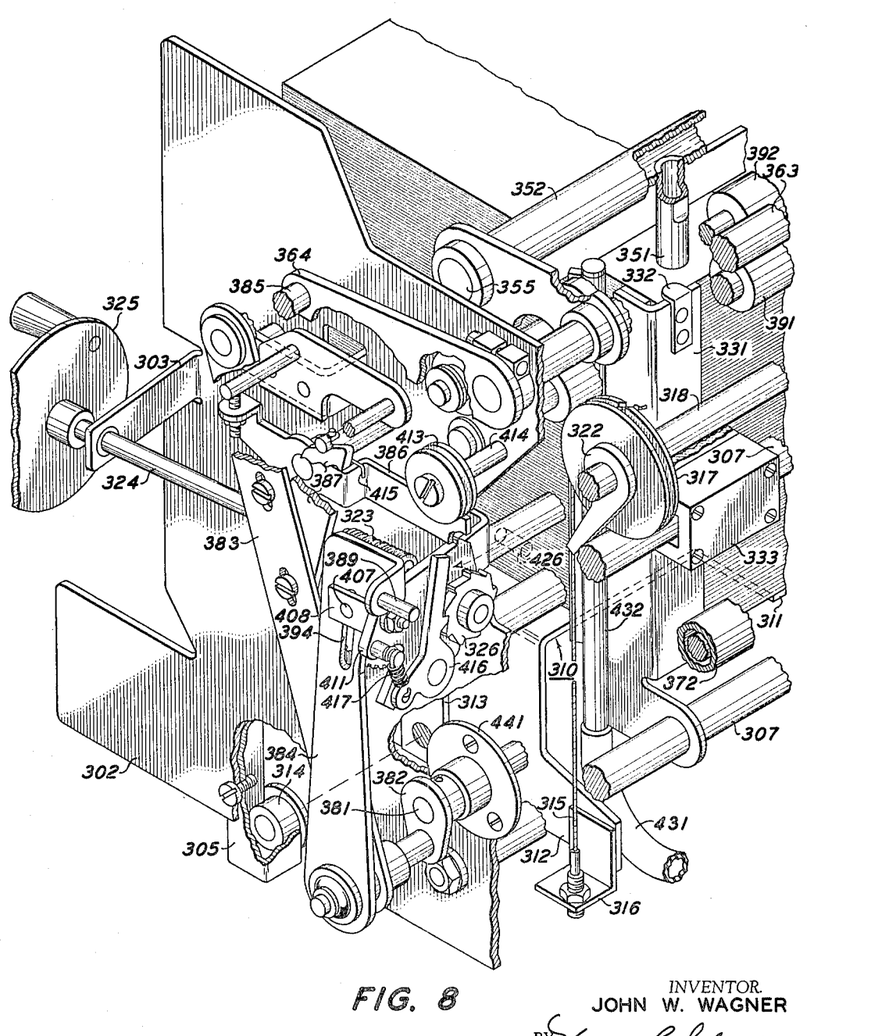
FIG. 8 is a rear left-hand perspective view of the sheet feed mechanism.

To align the leading edge of stack of paper in terms of the direction of paper travel on the paper table, there is provided at opposite sides of the table, vertically extending margin guides 331 provided at the topmost portion with inwardly extending snaps 332. At the opposite end, the side guide portion of each margin guide terminates in an arm apertured to slideably receive the lower right-hand tie rod 307 as seen in FIG. 8. Intermediate its ends, each margin guide is secured to a bearing block 333 journaled to slide on another tie rod 307. With this arrangement, the margin guides may be moved to compensate for varying widths or lengths of paper. In the xerographic reproducing apparatus shown, the paper is fed edgewise to permit optimum use of the peripheral surface of the xerographic drum during transfer.

The rear margin of the stack of paper on the table is aligned by paper stops 334 which are positioned to contact the trailing edge of the stack lightly to hold the paper in contact with the margin guides 331. The paper stops are adjustably secured to blocks 335 by screws 336 threaded therein. The blocks 335 are secured to a rod 337 which is supported by one end of arms 338 and 339, the opposite ends of these arms being pivotably supported on stub shafts 341 and 342, respectively, mounted on plates 301 and 302, respectively.

Figure 6:
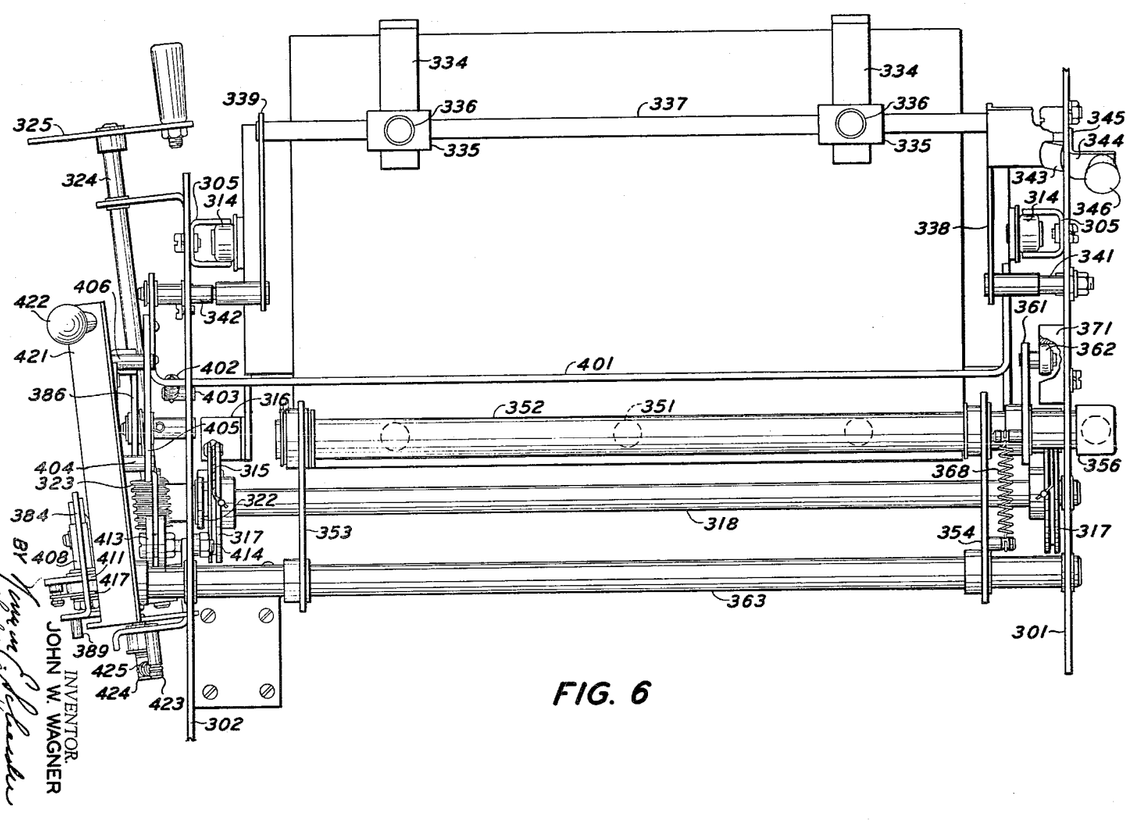
FIG. 6 is a top view of the sheet feed mechanism.

The stops are maintained in contact with the rear margin of a stack of paper by means of a cam 343 secured to lever 344. The lever 344, in the form of a leaf spring, is suitably fixed at one end to the outboard face of plate 301, and a handle 346 is suitably secured to the free end of this leaf spring forming the lever. The cam 343 secured to a free portion of the leaf spring extends through an aperture in plate 301 into interference relation with the arm 338, which supports the rod 307 carrying stops 334, whereby the sharp fall of the cam 343 will engage this arm when the stops are in operative position. By flexing the leaf spring, to the right as seen in FIG. 6, the cam is released from the arm and this entire assembly may be rotated to move the stops out of engagement with the rear margin of the stack of paper.

The sheet separating mechanism for separating the top sheet from the stack includes a number of suction feet 351, three being shown in the prefered embodiment, which by suction pick up the topmost sheet and advances this sheet into the bite of feed rolls 391 and 392.

Each suction foot 351 comprises a hollow tube secured at one end to hollow manifold tube 352 journaled at opposite ends in pivot arms 353 and 354. One end of the tube 352 is sealed, as for example by plug 355, the opposite end of tube 352 being connected by elbow 356 and flexible conduit 357 to the inlet of a motor MOT–7 driven vacuum pump, not shown. A suitable limiting valve is used to limit suction pressure. A cam follower arm 361 carrying cam follower 362 is also secured to the manifold tube 352 adjacent the elbow. The opposite ends of pivot arms 353 and 354 are secured to rock shaft 363 journaled in plates 301 and 302.

Figure 2:
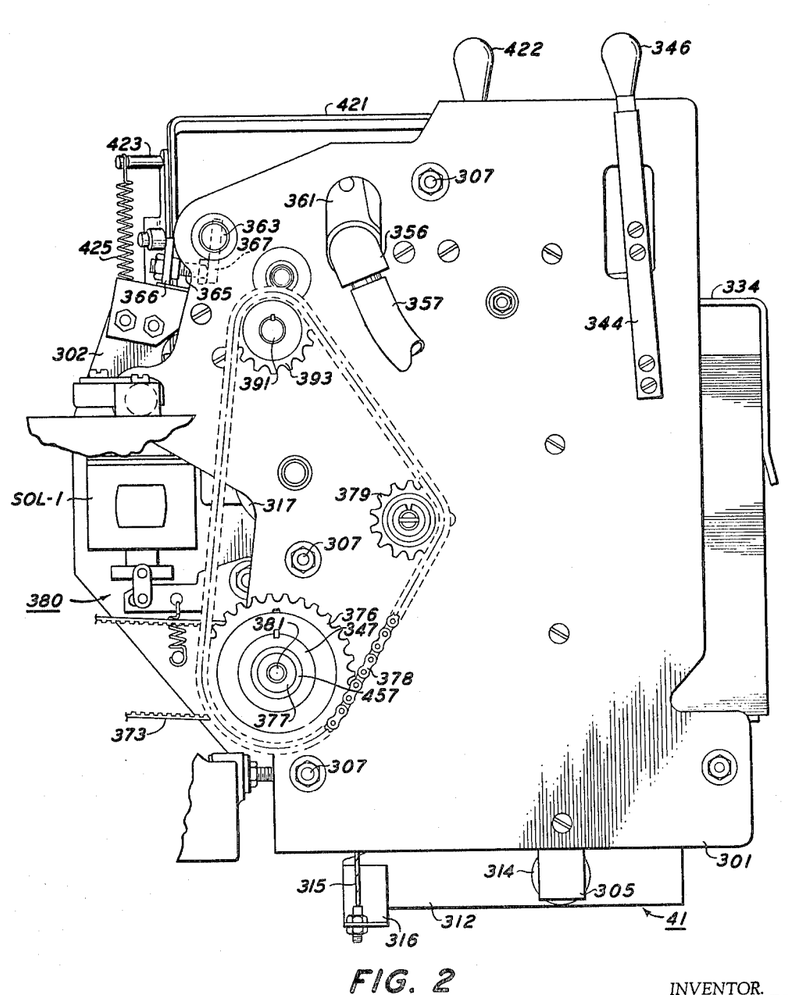
FIG. 2 is a front view of the paper separator mechanism of the invention.
Figure 3:
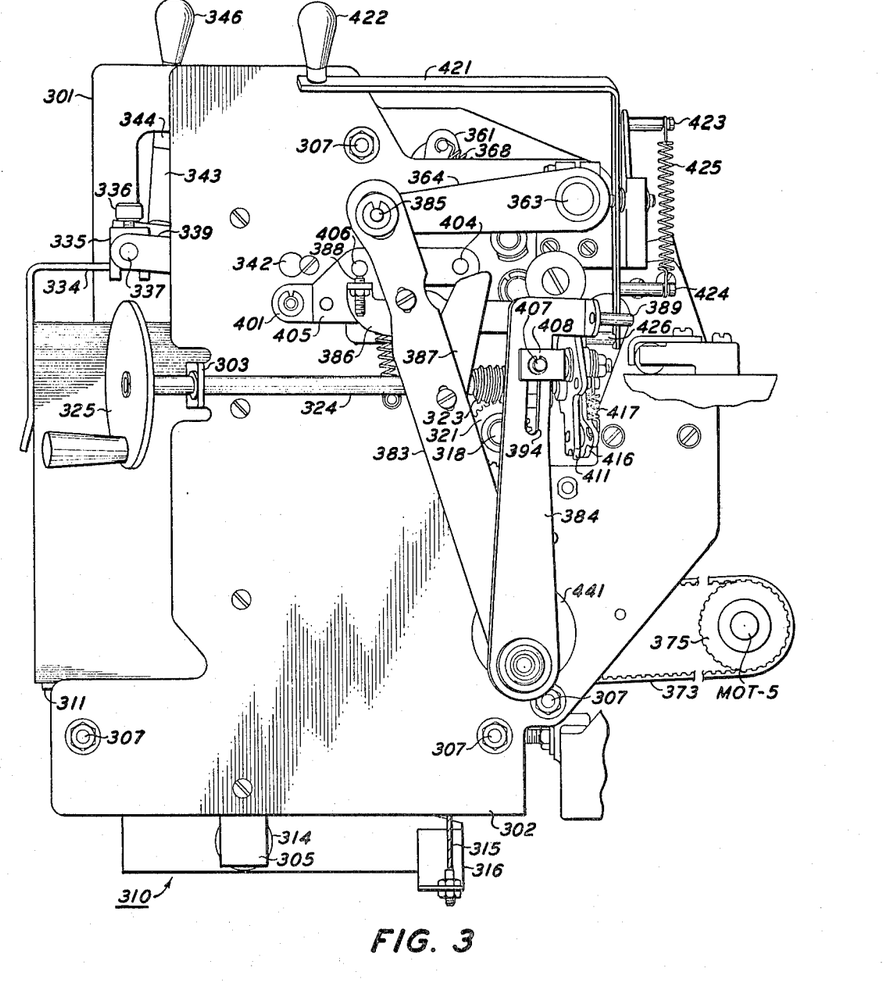
FIG. 3 is a rear view of the paper separator mechanism.
Figure 4:
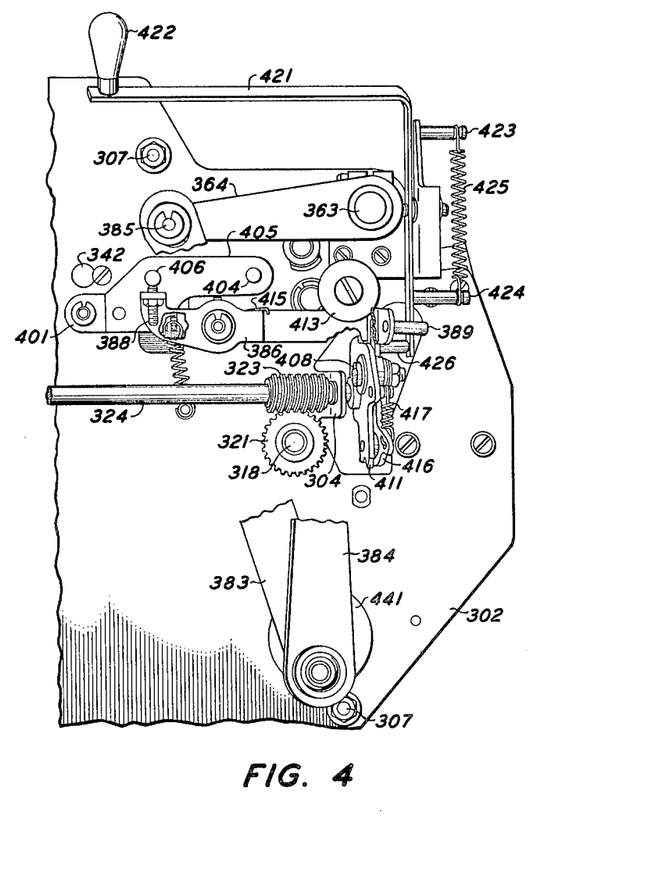
FIGS. 4 and 5 are front views of the paper separator mechanism with parts broken away to show the arrangement of the various drive mechanisms of the sheet feed mechanism.

As shown in FIG. 3, a lever 364 is secured at one end to rock shaft 363 to impart a rocking motion to the rock shaft. The motion of the rock shaft in a clockwise direction, as seen in FIG. 2, being adjustably controlled by adjusting screw 365 threaded through bracket 366 into engagement with radial stop 367 fixed to the rock shaft.

Figure 5:
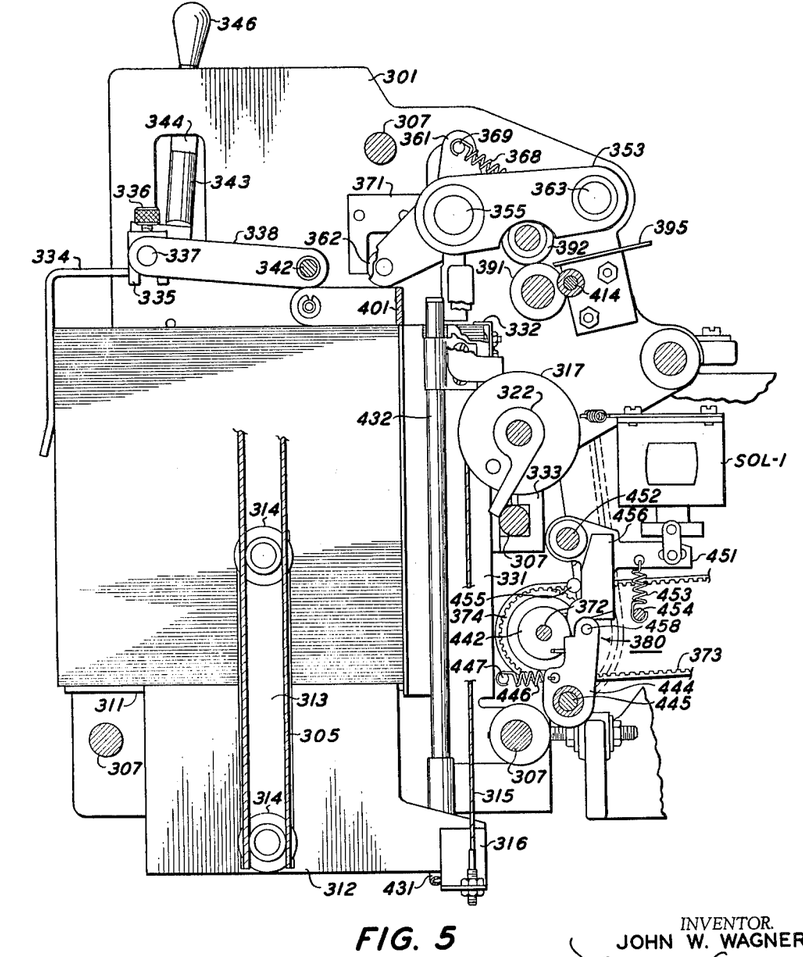

The rocking of rock shaft 363 will cause the outer ends of pivot arms 353 and 354 carrying manifold tube 352 to travel in an arc. As this happens, the cam follower 362 on cam follower arm 361 is biased by spring 368 into engagement with cam plate 371 fixed to plate 301, as shown in FIGS. 5 and 6. Spring 368 is secured at opposite ends to pins 369 extending from pivot arm 354 and from the cam follower arm.

As seen in FIG. 5, the cam plate or guide plate 371 has a substantially vertical guide surface and a horizontal guide surface, so that as the rock shaft 363 rocks clockwise, the lower ends of the suction feet will, from a position in contact with the topmost sheet, move upward as the cam follower 362 rides up the vertical guide surface. When the cam follower engages the horizontal guide surface of the cam plate 371, the continued rocking of rock shaft will cause the suction feet to rotate about the axis of manifold tube 352 toward the feed rollers 391 and 392.

To effect operation of the suction feet to separate and advance a sheet in timed relation to the formation of an image on the xerographic drum, and to effect operation of the feed rolls 391 and 392, and to effect power raising of the paper tray, the entire sheet feeding mechanism is driven through hollow shaft 372 suitably journaled in plates 301 and 302. Shaft 372 is operatively connected to a motor MOT–5 by chain belt 373 engaging chain sprockets 374 and 375 fixed to hollow shaft 372 and the shaft of the motor, respectively.

Figure 7:
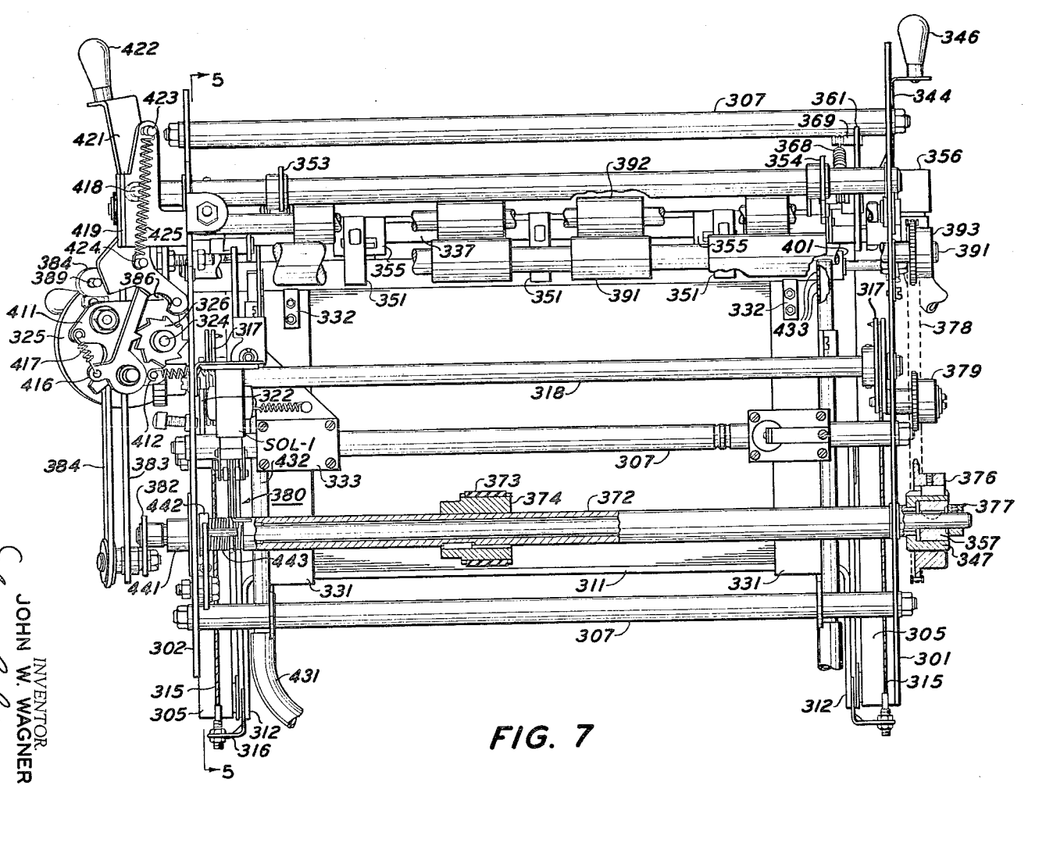
FIG. 7 is a left-hand view of the sheet feed mechanism.

As shown in FIGS. 2 and 7, a sprocket 376, keyed to hub 347 secured as by brazing to the outboard end or right-hand end of the hollow shaft 372, is connected by chain 378 to drive driven sprocket 393 fixed to the outboard end of feed roller 391, both feed rollers 391 and 392 being suitably journaled in plates 301 and 302. Chain 378 extends from sprocket 376 up to and partly around idler sprocket 379, up and around driven sprocket 393, then back to sprocket 376.

A shaft 381, which extends out from opposite ends of the hollow shaft 372, is supported by suitable bearings positioned inside the hollow shaft 372 and by a bearing 441 secured to plate 302. On the left-hand end, as seen in FIG. 7, the shaft 381 is driven by shaft 372 through a solenoid SOL–1 controlled single revolution clutch, generally indicated by reference character 380. As shown, a clutch hub 442 is secured to the inner shaft 381 and a coiled clutch spring 443 encircles the shaft 372 adjacent the clutch hub with one end of the clutch spring being engaged in a suitable slot formed in the clutch hub.

The periphery of the clutch hub is also provided with a stepped or stop portion adapted to be engaged by a clutch stop lever 444 secured by shoulder bolt 445 inboard of plate 302. The clutch stop lever is normally biased in a counterclockwise direction, as seen in FIG. 5, into engagement with the clutch hub by spring 446 secured at one end to pin 447 extending inboard from plate 302 and at its opposite end the spring is secured in a suitable aperture in the clutch stop lever.

The opposite end of the clutch spring has an external contact arm of sufficient length to be engaged by the turned out shoulder on the bottom of clutch arm 451 whereby the clutch spring can be uncoiled to loosely encircle shaft 372 out of driven engagement thereby. The clutch arm 451 is journaled on a shoulder bolt 452 secured to plate 302. The clutch arm is normally biased in a clockwise direction by a spring 453 secured at one end to pin 454 extending inboard from plate 302 and at its opposite end in a suitable aperture in the clutch arm to position the turned out shoulder of this member in interference relation with the contact arm of the clutch spring for the purpose previously described. A stop pin 455 extends from plate 302 in interference relation to the clutch arm to limit the clockwise movement of the contact arm.

Motion of the clutch arm in a counterclockwise direction is effected by the solenoid SOL–1. When the clutch arm is moved in this direction by retraction of the plunger of the solenoid, the turned out shoulder of the clutch arm becomes disengaged from the clutch spring to allow the clutch spring to coil up and grab the shaft 372 for rotation therewith. At the same time, the pin drive arm 456, which is secured as by spot welding to the clutch arm 451, will engage the pin 458 extending from clutch stop lever 444 to rotate this element in a clockwise direction out of engagement with the clutch hub to allow it and shaft 381 to be rotated by the clutch spring.

The opposite end of shaft 372 is connected to shaft 381 by an overrunning clutch 457 which is keyed to shaft 381 and retained axially thereon by collar 377. The peripheral portion of the overrunning clutch 457 engages the inner recessed portion of hub 347. This overrunning clutch arrangement is used to prevent shaft 381 from being rotated by the weight of the elements being driven by it.

An eccentric 382 connected to the outboard end of inner shaft 381 drives crank arms 383 and 384 pivotally secured thereto. Crank arm 383 is connected by pin 385 to one end of lever 364 which, as previously described, is connected at its opposite end to rock shaft 363 for actuating this shaft. A control arm 386 is also pivotally mounted on crank arm 383 and an actuating arm 387 is fixed to the crank arm intermediate the ends thereof for a purpose to be described.

Referring now to the operation of the pack advance mechanism used to periodically raise the table so that the topmost sheets of the stack are properly maintained in sheet gripping relation to the suction feet, the operation of this mechanism is controlled by a sensing device. The sensing device includes a bail 401 pivotally mounted on stub shafts 341 and 342, and normally biased into contact with the top sheet of the stack by spring 402 secured at one end to the bail and at its other end to pin 403 fixed to plate 302.

As crank arm 383 is actuated to effect movement of the suction feet 351, the actuating arm 387 is raised to strike the follower pin 404 on a gauge bar 405 secured to the left-hand end of bail 401, as seen in FIG. 6, whereby the bail is lifted off the paper during an actual feeding operation. Further actuation of the crank arm 383 will draw the actuating arm 387 downward, and the bail will again drop down onto the topmost sheet. However, if a sufficient quantity of sheets have been removed from the stack so that the height of the topmost sheet is below a predetermined height, the bail as it is dropped toward the top sheet, will not be stopped by this sheet. Instead, the bail will fall sufficiently to allow control pin 406 on gauge bar 405 to contact adjusting screw 388 secured to one end of control arm 386. When this occurs, the control arm 386, which is normally biased in a clockwise direction by a torsion spring 415, will now be rotated in a counterclockwise direction whereby the opposite end of the control arm 386 from adjusting screw 388 will become disengaged from the cam lobe formed on bellcrank 411.

Referring now to the crank arm 384, which is also driven by eccentric 382, this crank arm is provided at one end with a turned out portion to which an actuator pin 389 is secured. This crank arm is also formed with an elongated slot 394 to receive actuator pin 407 of block 408 fixed to bellcrank 411 which is pivotally secured to shaft 324. As the eccentric 382 is rotated during each revolution of the shaft 381 driven through the single revolution clutch, previously described, the actuator pin 407 will simply slide in the elongated slot 394 of the crank arm 384 as it is raised or lowered, since this actuator is positioned, by the cam lobe formed in the bellcrank 411 contacting the end of control arm 386, so that it is out of contact with the ends of the slot 394. The bellcrank 411 is normally biased by spring 412 whereby the cam lobe thereon is positioned in engagement with the end of control arm 386, as seen in FIG. 7. To prevent deflection of the end of control arm 386, the upper end of this control arm is retained in the groove of retaining ring 413 fixed to stud 414 in plate 302. As described, the control arm 386 is also normally biased by torsion spring 415 in a clockwise direction, as seen in FIG. 7, to engage the cam lobe of bellcrank 411.

The bellcrank 411 is provided with a pivot pawl 416 adapted to engage ratchet 326, the pawl being normally biased into engagement therewith by spring 417.

Referring again to the situation in which the crank arm 384 has been rotated in a counterclockwise direction as a result of the lowering of the height of the paper stack, this motion causes the crank arm to become disengaged from the cam portion of bellcrank 411, which, then, because of the biasing action of spring 412, will rotate to bring actuator pin 407 into driven engagement with the bottom of slot 394 in crank arm 384. As the actuator pin 407 is actuated by the crank arm, the bellcrank is rotated clockwise causing the pawl 416 to engage a tooth of ratchet 326 to index the ratchet one step, thereby rotating shaft 324 carrying worm 323 which engages gear 321 to raise the table through the mechanism previously described. Further rotation of bellcrank 411 will cause the cam thereon to re-engage the control arm 386.

To effect lowering of the paper table 310 through manual operation of hand wheel 325, the pawl 416 must be disengaged from ratchet 326. This is effected by lever 421 pivotally connected by pivot 418 to lever bracket 419 fastened to plate 302.

A striker pin 426 extends from the lower end of the lever to strike the pawl 416 when the lever is rotated in a clockwise direction, as seen in FIG. 7, by knob 422 fixed to the opposite end of the lever. As the lever is rotated, the striker pin 426 engages the pawl 416 to force it against stop pin 389 on crank arm 384. Lever 421 is normally biased in a counterclockwise direction to maintain striker pin 426 out of contact with pawl 416 over the center mounted spring 425. Spring 425 is fastened at one end to pin 423 in lever bracket 419 and at its opposite end to pin 424 in lever 421.

Referring again to the separation of single sheets from the stack, the pressure side of the vacuum pump is connected by conduits 431 to manifold condutis 432 positioned on opposite sides near the leading edges of the stack of sheets. Apertures 433 in the manifold conduits direct air under pressure toward the sides of the topmost sheets of the stack whereby the sheets are separated from each other to pre-condition the sheets for removal by the suction feet.

Paper advanced by feed rollers 391 and 392 is guided by paper guide 395, extending between plates 301 and 302, onto paper transport 44 for advancement thereby toward the xerographic drum 20.

While the invention has been described with reference to the structures disclosed herein, it is not confined to the details set forth, and this application is intended to cover such modifications or changes as may come within the purposes of the improvements or the scope of the appended claims.

What is claimed is:

1. A sheet feed mechanism including
   a frame,
   a pair of feed rolls journaled in said frame,
   a support for a stack of sheets to be fed,
   a rock shaft journaled in said frame,
   a power driven lever connected to one end of said rock shaft to impart a rocking motion thereto,
   a pair of arms secured to said rock shaft,
   a hollow tube journaled in the ends of said arms,
   at least one separator member secured to said hollow tube,
   a cam follower means secured to one end of said hollow tube,
   a cam secured to said frame,
   and means to bias said cam follower into cooperative engagement with said cam,
   said cam having a substantially vertical guide surface and a substantially horizontal guide surface whereby as said rock shaft is rocked, the separator member will move from a position in contact with the topmost sheet on said support upward as said cam follower means engages said substantially vertical cam guide surface and then as said rock shaft is further rotated, the cam follower means engages the substantially horizontal guide portion to cause the separator member to rotate toward said pair of feed rolls.

2. A sheet feed mechanism including
   a frame,
   a pair of feed rolls journaled in said frame,
   a support for a stack of sheets to be fed,
   a rock shaft journaled in said frame,
   a power driven lever connected to one end of said rock shaft to impart a rocking motion thereto,
   a pair of arms secured to said rock shaft,
   a hollow tube journaled in the ends of said arms, at least one separator member secured to said hollow tube,
a pivot arm secured to one end of said hollow tube,
a cam follower roller journaled in said pivot,
a cam secured to said frame,
and means to bias said cam follower into cooperative engagement with said cam,
said cam having a substantially vertical guide surface and a substantially horizontal guide surface whereby as said rock shaft is rocked, the separator member will move from a position in contact with the topmost sheet on said support upward as said cam follower means engages said substantially vertical cam guide surface and then as said rock shaft is further rotated, the cam follower means will engage the substantially horizontal guide portion to cause the separator member to rotate toward said pair of feed rolls.

References Cited by the Examiner

UNITED STATES PATENTS

| | | | |
|---|---|---|---|
| 2,185,652 | 1/1940 | Spiess | 271—27 |
| 2,243,170 | 5/1941 | Seybold et al. | 271—27 |

M. HENSON WOOD, JR., *Primary Examiner.*